United States Patent [19]

Petz

[11] Patent Number: 5,163,360
[45] Date of Patent: Nov. 17, 1992

[54] CONTROLLED ATMOSPHERE STORAGE FACILITY

[75] Inventor: David Petz, Tracy, Calif.

[73] Assignee: California Ammonia Co., Stockton, Calif.

[21] Appl. No.: 498,003

[22] Filed: Mar. 23, 1990

[51] Int. Cl.$^5$ ............................................ A23B 7/14
[52] U.S. Cl. .................................... 99/468; 52/143; 52/198; 99/467; 212/160; 212/226; 414/266; 414/278; 422/1; 422/40; 422/105; 454/189
[58] Field of Search ............... 422/1, 40, 9-10; 52/192, 196, 198, 143; 99/467, 470, 473; 426/316, 319; 414/288, 278, 273, 217, 298, 294, 292, 266; 212/226, 160; 98/31.6, 32, 34.5, 49, 54, 346

[56] References Cited

U.S. PATENT DOCUMENTS

| Re. 1,960 | 6/1865 | Nyce | 99/425 |
| Re. 26,165 | 2/1967 | Stolz | 105/37 |
| 518,901 | 4/1894 | Sherman | 112/321 |
| 2,121,495 | 6/1938 | Bledsoe | 422/40 X |
| 2,388,701 | 11/1945 | Neff | 126/163 A |
| 3,183,683 | 5/1965 | Reiter et al. | 422/40 X |
| 3,313,631 | 4/1967 | Jensen | 422/40 X |
| 3,339,475 | 9/1967 | Martin | 422/40 X |
| 3,344,933 | 10/1967 | Jelatis et al. | 212/160 |
| 3,415,310 | 12/1968 | Kuhlman | 165/27 |
| 3,824,917 | 7/1974 | Kawahara et al. | 422/302 X |
| 3,958,028 | 5/1976 | Burg | 426/418 |
| 3,972,420 | 8/1976 | Stock et al. | 212/220 X |
| 4,066,401 | 1/1978 | Solomon | 422/40 |
| 4,078,480 | 3/1978 | Luck | 99/476 |
| 4,155,967 | 7/1979 | South et al. | 264/32 |
| 4,279,858 | 7/1981 | Huling | 422/302 X |
| 4,324,074 | 4/1982 | South et al. | 52/80 X |
| 4,824,685 | 4/1989 | Bianco | 426/418 |
| 4,827,689 | 5/1989 | Lonardi et al. | 52/747 X |

Primary Examiner—Lynn M. Kummert
Assistant Examiner—Amalia Santiago
Attorney, Agent, or Firm—Gregory Garmong

[57] ABSTRACT

A live storage facility provides for the storage of large containers of product in a gas-tight enclosure containing an atmosphere precisely controlled to a preselected gas composition. Containers are introduced into the enclosure through a tunnel and removed through another tunnel, without significantly altering the gas atmosphere or temperature within the enclosure. An externally controlled crane moves and stacks the containers within the enclosure. The storage facility is preferably formed as a hemispherical dome with continuous walls that are impermeable to the gas. In one form, the product is agricultural produce, and there is additionally provided a cooling capability so that the product is stored at reduced temperature.

21 Claims, 8 Drawing Sheets

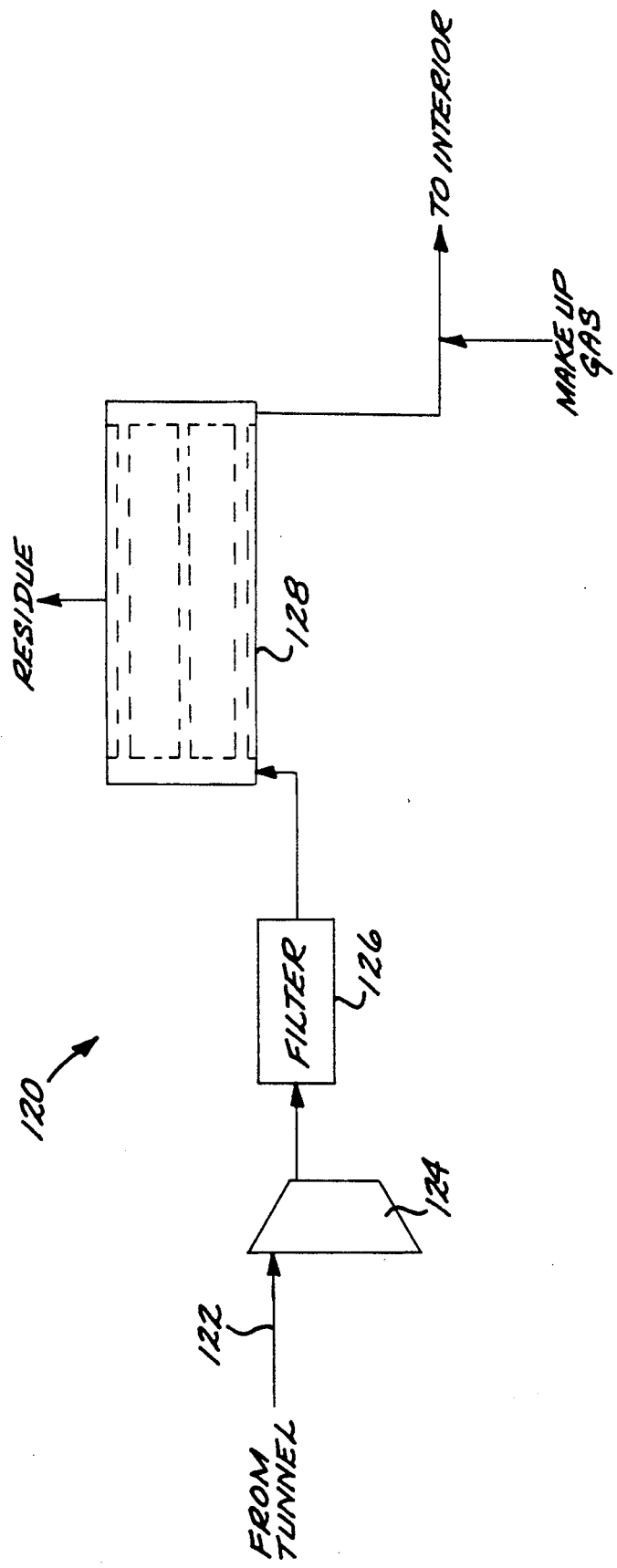

5,163,360

CONTROLLED ATMOSPHERE STORAGE FACILITY

BACKGROUND OF THE INVENTION

This invention relates to storage systems, and, more particularly, to a controlled atmosphere storage facility for storing containers of products such as agricultural produce.

Most agricultural products are produced in a seasonal fashion. That is, the crops do not mature uniformly throughout the year. There is usually a peak production season when a large volume of the product is harvested and available, and then a long off-season when the product is not readily available from the producers.

The crop cycle is significant for agricultural producers, processors, and consumers. The prices paid for crops are usually lowest during the harvest period, resulting in low prices to the farmers. Processors of products are overloaded for a brief period, and then idle during the off-season. Consumers have fresh product available for only a limited period.

Preservation techniques such as canning, drying, and freezing make the produce available in those forms for longer periods. However, each of these procedures changes the essential nature of the food product. Thus, for example, a canned, dried, or frozen apple is simply not the same as a fresh apple.

When fresh food products such as apples or pears are stored in air for an extended period of time, they dehydrate and alter chemically, becoming less acceptable for processing and to consumers. Storage procedures have been developed for storing such fruits in a controlled atmosphere of, for example, 2 percent oxygen, 2 percent carbon dioxide, balance nitrogen. When stored in such an atmosphere for extended periods of time, such as 3-12 months, the fruit retains its essential quality at harvest. By this approach, consumers can have available certain types of fresh fruit throughout the year.

Controlled atmosphere storage facilities, in some cases refrigerated to about freezing temperature, have been increasingly used to store apples in such states as Washington and California. Such a facility typically includes a large enclosure made of sheet metal having joints that are sealed as tightly as possible. Containers of the produce are loaded into the enclosure, and the door sealed. The controlled atmosphere is introduced, and the interior cooled.

While operable for its purpose, such a storage facility has several important practical disadvantages. It may take at least a week to establish the controlled atmosphere and cool the product to the storage temperature. During that week, the quality of the fruit degrades. Also, it is necessary to accumulate an amount of fruit sufficient to fill the storage facility before it is sealed, again causing a delay in the product reaching the storage condition. Although controlled atmosphere certification regulations may permit such delays, they are nevertheless undesirable. When the produce is to be removed from the facility, the door seal is broken, and the entire contents of the facility subjected to atmospheric conditions so that the product can be removed. There is then a brief oversupply of the product, and thereafter, once again, none is readily available. The product to be stored must be homogeneous in the sense that all of it is loaded into the storage facility at once, and is removed at once. The existing storage facilities are not suited to storing a diversity of products at the same time. Finally, the conventional construction of the storage facility is uneconomical if the size is relatively small, and results in heat and gas leaks if the facility is relatively large.

One approach to an improved storage approach has been to place the articles to be stored into individually sealed containers. The protective atmosphere is established within the container, which may also be placed into a cooled storage locker. While perhaps acceptable for small items and small quantities, such an approach is not practical for the storage of large amounts of large containers.

There is therefore a need for an improved storage facility for agricultural produce and other articles that require protected storage. The present invention fulfills this need, and further provides related advantages.

SUMMARY OF THE INVENTION

The controlled atmosphere storage facility of the invention permits the storage of articles in unsealed containers that are individually introduced into the storage facility, stored for short or long periods, and removed at will. The entire facility is maintained in a controlled state of atmosphere and, optionally, temperature, so that the introduction or removal of each container has essentially no adverse effect on the storage conditions of the other containers. A system is provided for introducing the filled storage containers into the storage facility to bring the articles to the controlled atmosphere and temperature quickly. When applied for agricultural use, the approach of the invention permits produce to be placed into the storage conditions within hours of picking, ensuring the preservation of its quality. When the produce is to be removed, individual containers can be removed at will, without interrupting the storage conditions of the remainder of the product. Other containers can be introduced even as removal of previously stored containers is under way. The construction of the storage facility is highly economical, and minimizes heat and gas loss over extended periods.

In accordance with the invention, a controlled atmosphere storage facility comprises a gas-tight enclosure sufficiently large to contain a plurality of storage containers; means for supplying a gas other than air into the enclosure; means for introducing storage containers into the storage facility without disturbing those storage containers already in the storage facility and without introducing contaminant gases into the storage facility; means for removing storage containers from the storage facility without disturbing other storage containers in the storage facility and without introducing contaminant gases into the storage facility; means for moving the containers within the enclosure; and controller means for controlling the means for introducing, the means for removing, and the means for moving.

The gas tight enclosure is preferably a hemispherical dome formed by applying insulation and concrete to the interior of an air form. There are no seams in such structure to permit gas leaks, and the surface area of the enclosure is minimized to reduce heat loss. The controlled atmosphere can be provided by any acceptable means, but preferably is supplied by a recirculating filtration and gas separation system that continuously reconditions the gas flowing into one part of the storage facility and withdrawn at another part. The means for introducing and means for removing are preferably above-ground tunnels of extended length that permit the containers to be moved continuously into or out of the facility. The gas supply preferably removes gas through the tunnels to the reconditioning plant, establishing a countercurrent flow of gas to prevent leakage of air into the storage facility. At most an insignificant amount of contaminant gas can find its way into the interior of the storage facility as containers are introduced through the tunnel due to the countercurrent gas flow. The tunnel for introducing containers is provided with a precooling capability, where the product is to be stored at reduced temperatures. There is a mechanism for moving the containers within the storage facility, such as a crane, and most preferably a polar crane for the preferred hemispherical dome facility. A controller such as a microcomputer and associated sensor inputs and motorized outputs is used to control the entire operation of the facility.

In a related embodiment also in accordance with the invention, a controlled atmosphere storage facility comprises a gas-tight enclosure sufficiently large to contain a plurality of unsealed storage containers; an entry tunnel through which storage containers are moved into the storage facility without disturbing those storage containers already in the storage facility and without introducing contaminant gases into the storage facility; an exit tunnel through which storage containers are moved out of the storage facility without disturbing other storage containers in the storage facility and without introducing contaminant gases into the storage facility; a crane within the enclosure, the crane being sufficiently large to move storage containers; a remote control system that controls the movement of the crane from outside the enclosure; a gas supply system that introduces pure gas into the enclosure, and withdraws contaminated gas through the entry and exit tunnels; and a cooling system that cools the storage containers as they are moved through the entry tunnel and while they are within the storage facility.

The facility of the invention is termed a "live" controlled atmosphere storage facility, because the containers that hold the articles to be stored can be moved into and out of the facility at will, permitting storage of products immediately upon demand and removal of stored products as needed, and storage of a diversity of products. The facility can be readily operated with a central control system. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 9 is a schematic view of the gas supply system for the storage facility.

DETAILED DESCRIPTION OF THE PREFERRED EMBODIMENT

In accordance with a preferred embodiment of the invention, a controlled atmosphere produce storage facility comprises a plurality of unsealed storage containers that contain produce; a hemispherical gas-tight enclosure resting upon a foundation, the enclosure being sufficiently large to contain the storage containers; an entry tunnel through which storage containers are moved into the storage facility without disturbing those storage containers already in the storage facility and without introducing contaminant gases into the storage facility, the entry tunnel having a water spray system that sprays cool water over the storage containers as they move through the entry tunnel; an exit tunnel through which storage containers are moved out of the storage facility without distrubing other storage containers in the storage facility and without introducing contaminant gases into the storage facility; a recirculating gas supply system that introduces a flow of a gas mixture of about 2 percent oxygen, 2 percent carbon dioxide, and balance nitrogen into the enclosure, withdraws a flow of the gas mixture from the enclosure through the entry and exit tunnels, and conditions the flow of the gas mixture before reintroducing it into the enclosure; a cooling tower in the center of the hemispherical enclosure through which a coolant is circulated; and a polar crane within the enclosure sufficiently large to move containers within the interior of the enclosure, the crane being pivotably supported upon the upper end of the cooling tower and upon the foundation.

Figure 1:
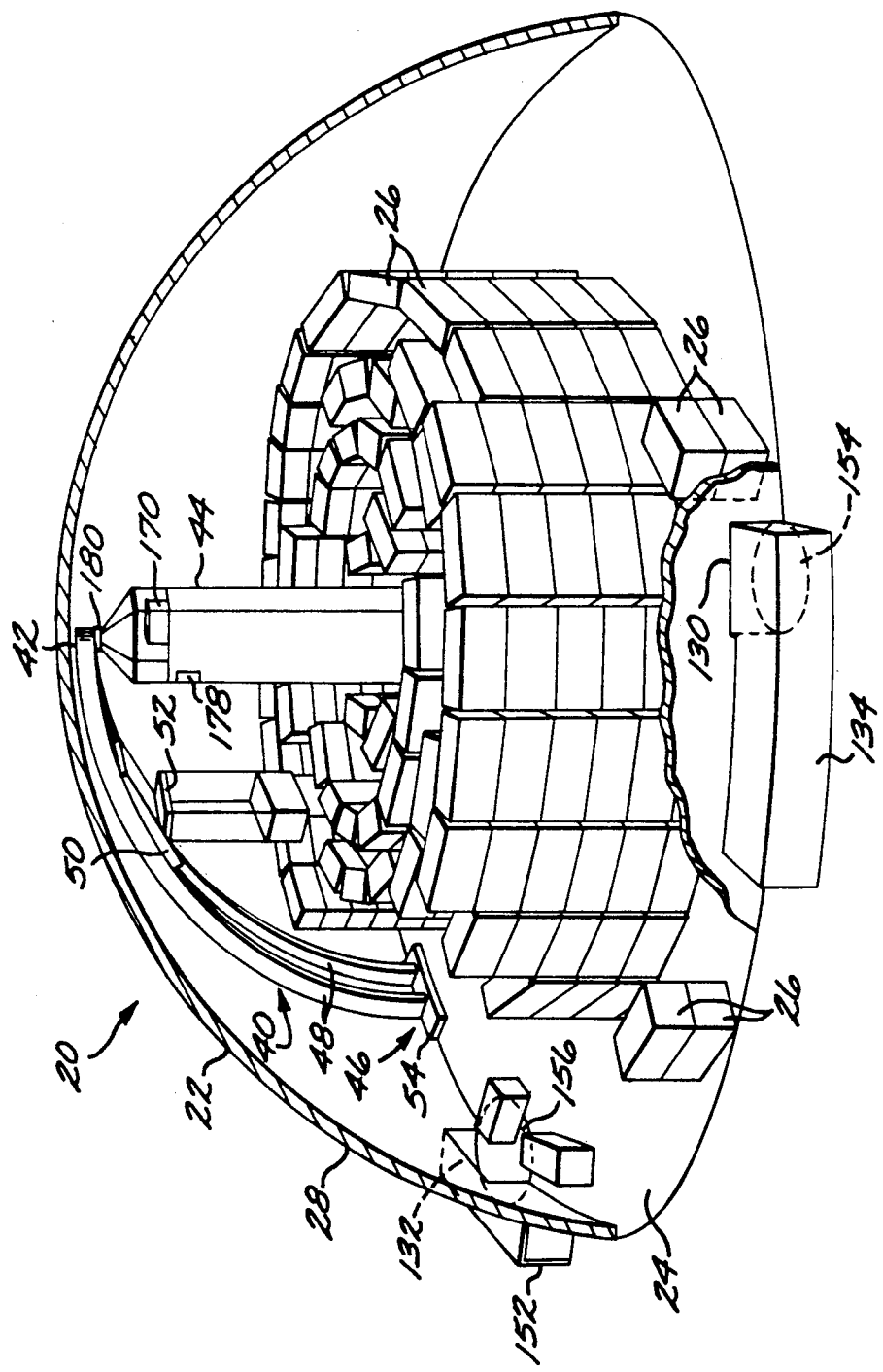
FIG. 1 is a perspective view of a preferred form of the storage facility, with portions of the wall broken away to illustrate the interior.

A preferred storage facility 20 is illustrated generally in FIG. 1. This storage facility 20 provides a controlled atmosphere and reduced temperature for the storage of agricultural produce such as, for example, apples or pears.

The storage facility 20 has a hemispherical dome-shaped enclosure 22 that rests upon a concrete foundation 24. The enclosure 22 is large enough to contain a plurality of storage containers 26. In a most preferred embodiment, the storage containers 26 illustrated in FIG. 1 are 8 feet wide, 8 feet high, and 17 feet long, and can each hold about 25,000 pounds of apples. The enclosure 22 is about 115 feet high, 230 feet in diameter at the base, and has the capacity to store about 1000 of the containers 26 stacked in the manner illustrated in FIG. 1.

Figure 7:
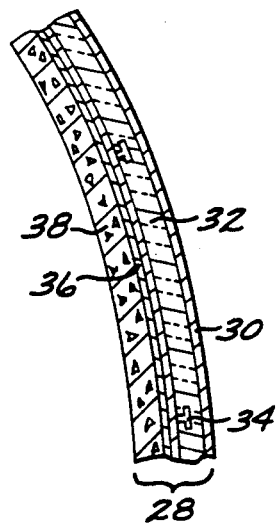
FIG. 7 is an enlarged side sectional view of the exterior wall of the storage facility.

The enclosure 22 is constructed so as to be gas-tight and of sufficient strength to withstand external wind loadings. The containers are not supported on the walls of the enclosure. A sectional view of a wall 28 of the enclosure 22 is illustrated in FIG. 7. The outer surface of the wall includes a layer 30 of a gas barrier material such as canvas coated with plastic, the layer 30 being about 0.95 inch thick. Interior to the layer 30 is an insulation layer 32 formed of polyurethane foam about 5 inches thick. A plurality of reinforcement bar hangers 34 are anchored within the insulation layer 32 and project inwardly from its interior surface. A network of steel reinforcement bars 36 are fastened to the interior ends of the hangers 34. A layer 38 of concrete such as shotcrete or gunnite encloses the network of reinforcement bars 36, the layer 38 ranging from about 4½ inches thick at the top of the dome to about 8 inches thick at the base of the dome.

The enclosure 22 is constructed by first furnishing and inflating an air form made of the material of the layer 30. The insulation layer 32 is sprayed over the interior of the air form. As the insulation layer 32 is gradually built up in thickness by repeated passes of a spray apparatus, the hangers 34 are fixed in place with the insulation sprayed around them. After the layer 32 is complete, the network of reinforcing bars 36 is fastened to the interior end of the hangers 34. The network is positioned so that it is within the concrete layer 38 that is sprayed over the interior of the insulation layer 32.

This construction technique and building form have been known previously, see, for example, U.S. Pat. Nos. 4,155,967 and 4,324,074, whose disclosures are incorporated by reference. Domed enclosures of this type are constructed by Monolithic Constructors, Idaho Falls, Id.

However, such buildings have not been previously used for controlled atmosphere facilities. The enclosure 22 made by this technique is well suited for use in a controlled atmosphere dome because it is gas impermeable, has no seams where gas leaks might develop over time, is resistant to wind loadings, is seismically stable, has a low surface-to-volume ratio to minimize heat loss from the reduced temperature interior, and is inexpensive to construct for its size. However, the domed enclosure is not well adapted for storing large numbers of rectilinear containers 26, unless special attention is given to the problem of optimizing the stacking of containers within the enclosure.

To achieve full utilization of the space within the interior of the dome-shaped enclosure, a polar crane 40 is utilized. The polar crane 40 is a bridge-type crane that is supported at an upper end 42 upon a central tower 44, and at a lower end 46 upon the foundation 24. A pair of curved beams 48 extends from the upper end 42 to the lower end 46. Each of the beams 48 has a cross section of an I-beam with a web and upper and lower flanges. The shape of the beams 48 follows, but is spaced apart from, the wall 28 of the enclosure 22. A trolley 50 rides on the beams 48 and can move between the lower end 46 and the upper end 42. The trolley 50 includes a hoist 52 that hooks to a container 26, lifts the container 26 up, and later lowers the container 26 to a selected position. The crane 40 can move containers 26 to any location within the enclosure 22, by rotating the beams 48 and thence the entire polar crane 40 about the tower 44, and moving the trolley up or down the beams 48.

The polar crane 40 permits containers to be moved between any locations within the enclosure 22. The containers 26 are conveniently stacked to substantial heights, up to about 10 containers high in the preferred embodiment. No aisles between the stacks are required or provided, greatly increasing the efficiency of space utilization. If a container is to be removed from the bottom of the stack, unstacking and restacking is required, but a temporary buffer stacking area is provided for this purpose. In practice, the containers are normally stored for at least several months, so that reshuffling of the stacks occurs relatively rarely. As will be described, in the preferred embodiment inventory control is maintained by a computer, so that each container can be readily traced.

Figure 2:
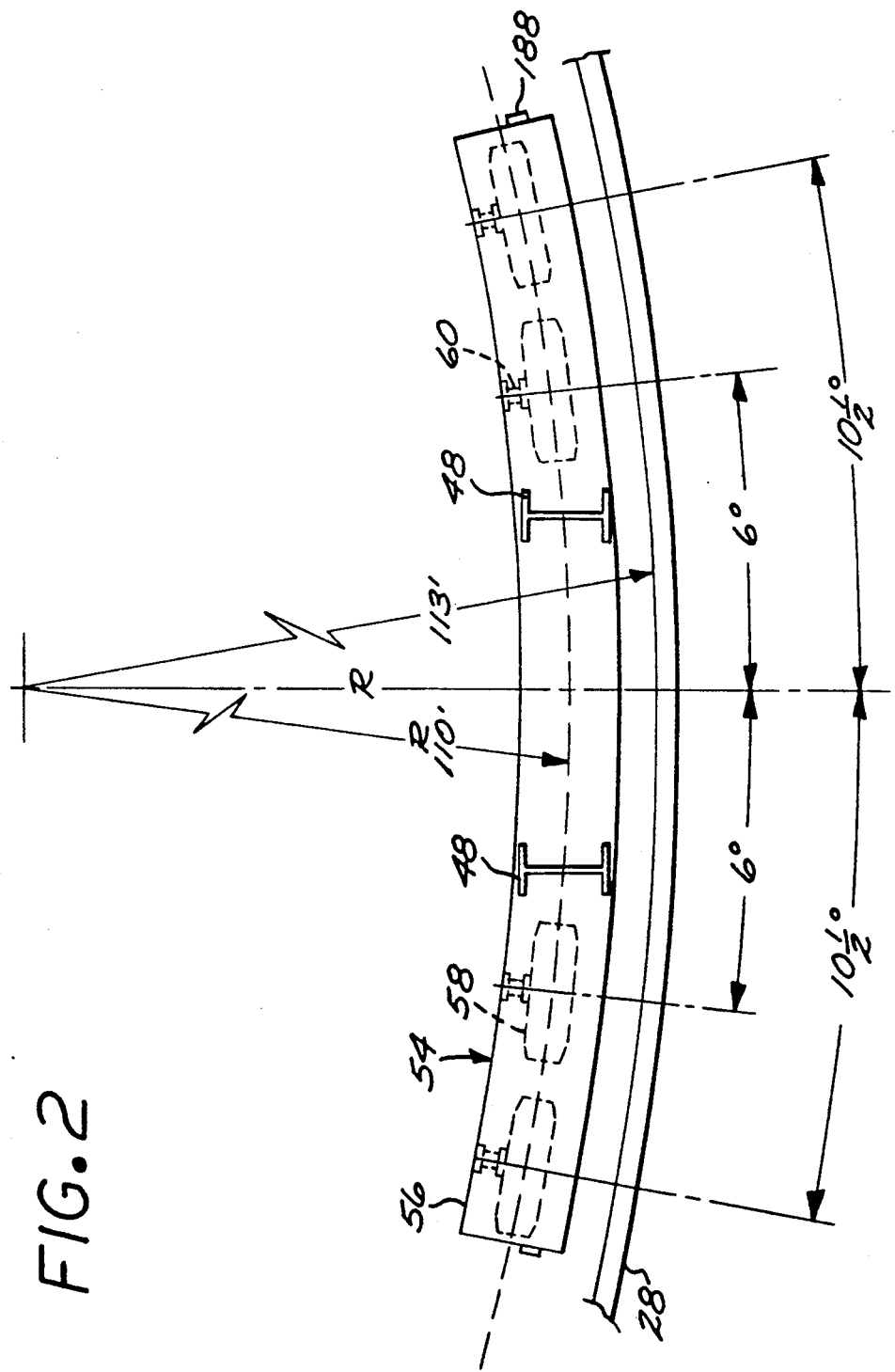
FIG. 2 is a plan view of the traversing drive of the polar crane.

FIG. 2 illustrates a lateral traversing mechanism 54 at the lower end 46 of the polar crane 40. The traversing mechanism 54 supports the lower end 46 of the beams 48 on a base 56 that rides along the foundation of four large pneumatic rubber tires 58. The axles of the wheels on which the tires 58 are supported are oriented radially, so that the tires 58 naturally roll along a circumference of a circle just inside the wall 28 of the enclosure 22. In the most preferred embodiment, the radius of the wall 28 at the location where it rests upon the foundation 24 is about 113 feet. The tires 58 roll along a circular path of radius about 110 feet. Each tire 58 is independently driven by its own hydraulic motor 60.

Figure 3:
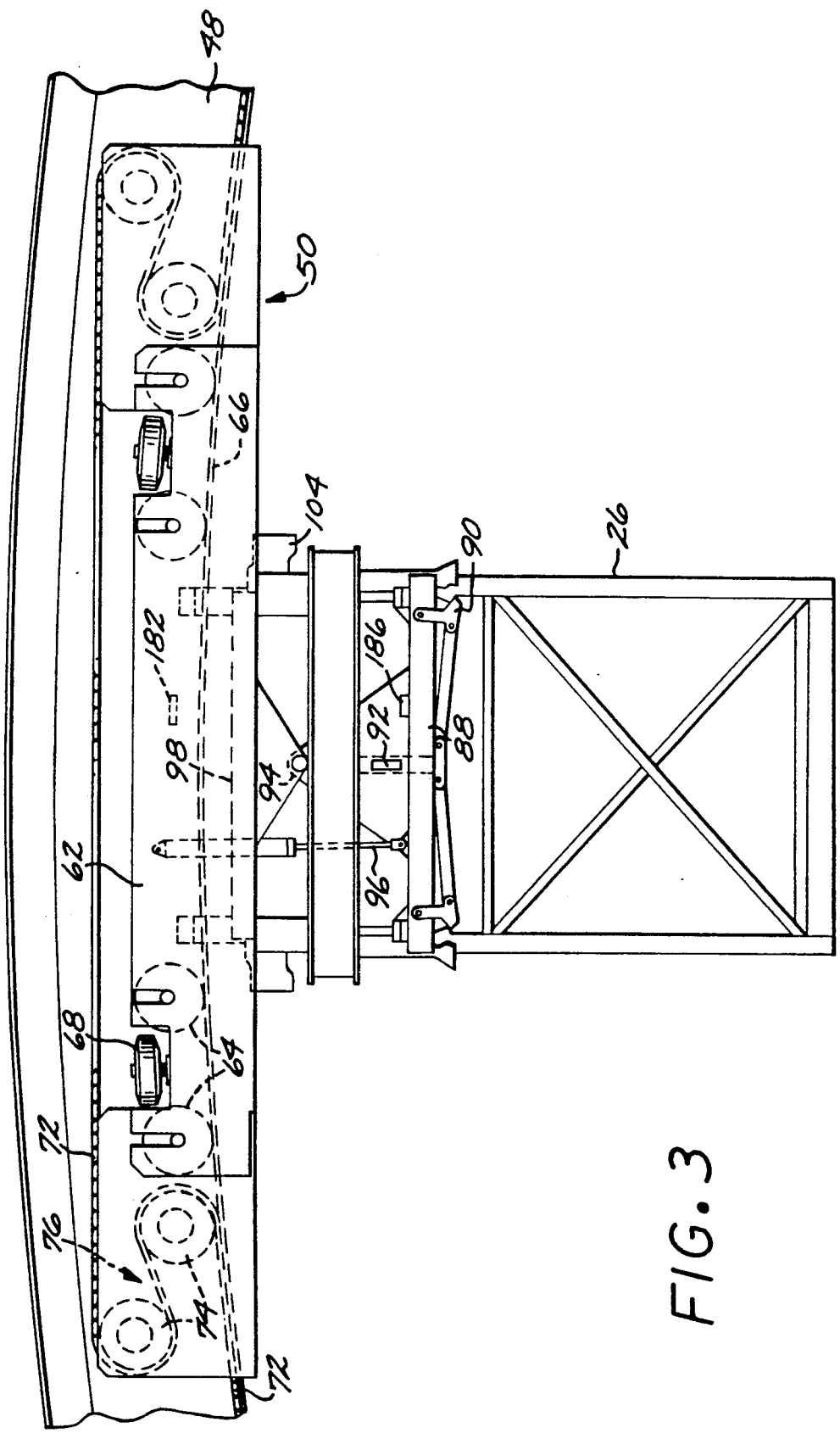
FIG. 3 is a side elevational view of the trolley of the polar crane.
Figure 4:
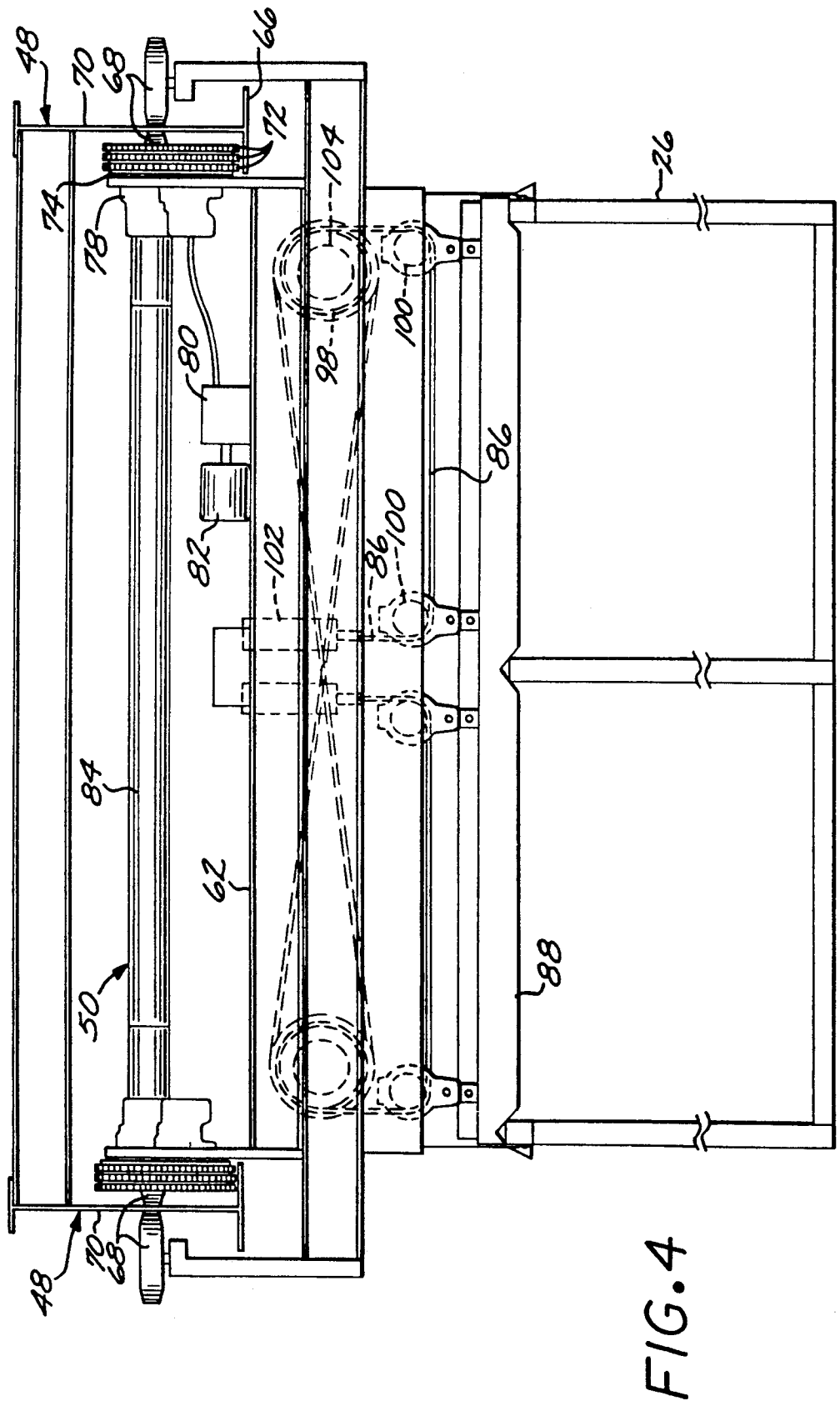
FIG. 4 is an end elevational view of the trolley of the polar crane.
Figure 5:
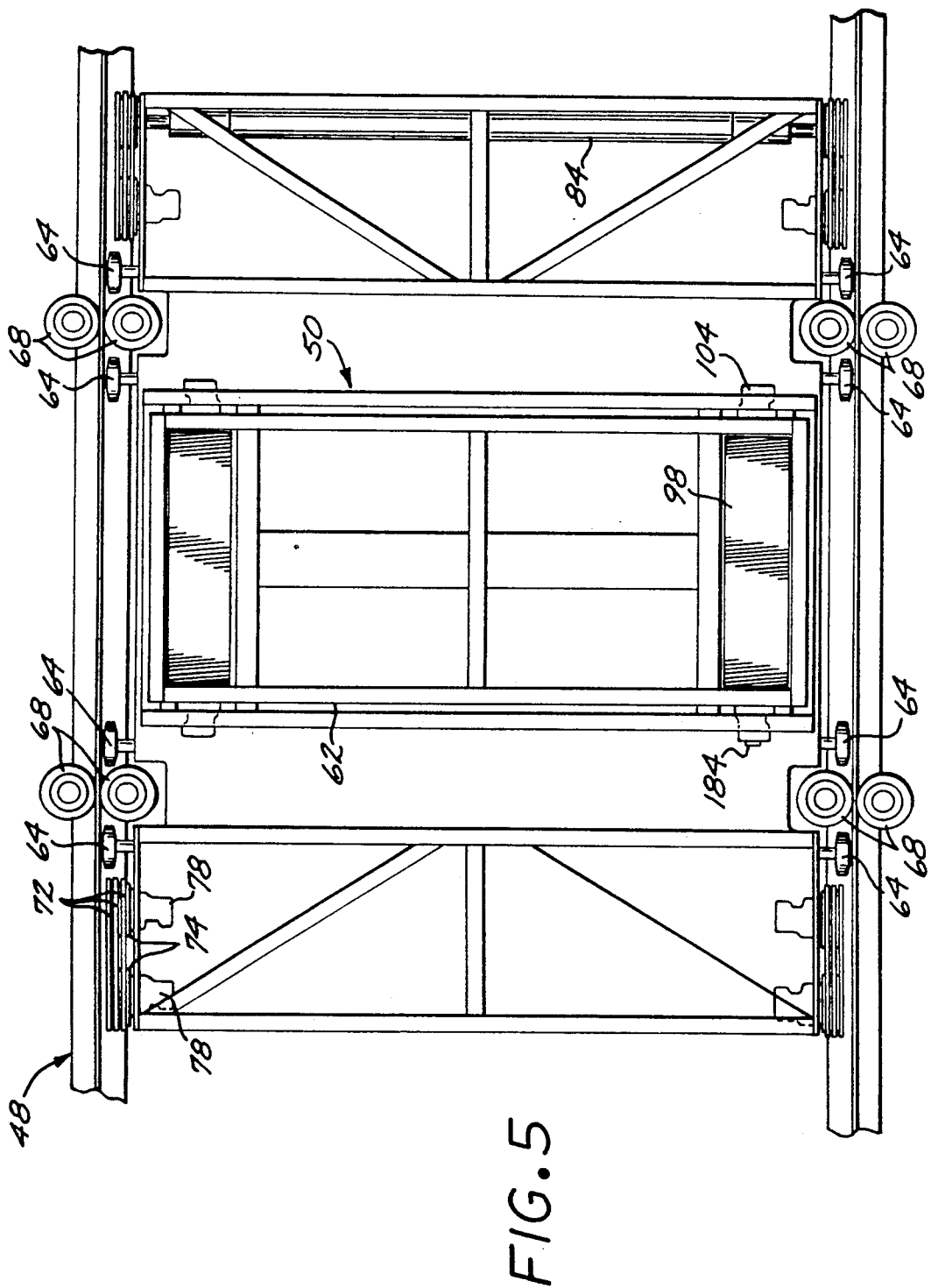
FIG. 5 is a top plan view of the trolley of the polar crane.

The trolley 50 and associated hoist 52 are illustrated in more detail in FIGS. 3-5. The trolley 50 includes a frame 62 that supports the active components of the trolley. Eight support wheels 64 are attached to the sides of the frame 62 to ride upon a lower flange 66 of each beam 48. The weight of the frame, the hoist, and the supported load are carried through the support wheels 64.

Four pairs of lateral positioning wheels 68 are attached to the frame 62 with their axles oriented perpendicular to the lower flange 66 of the beams 48. Each pair of the lateral positioning wheels 68 captures the web 70 of one of the beams 48 therebetween in the manner best illustrated in FIG. 5. The lateral positioning wheels 68 locate the frame 62 between the beams 48. All of the wheels 64 and 68 are preferably made of solid rubber.

The firm grasping of the two beams 48 by the frame 62 plays a role in maintaining the structural rigidity of the polar crane 40. The rigid frame 62 of the trolley 50 resists twisting motions that otherwise might deform the beams 48 beyond that permissible. That is, the frame 62 acts as a movable stiffening element for the polar crane 40.

The trolley 50 moves along the beams 48 by crawling along a pair of stationary chains 72. The chains 72 extend between the upper end 42 and the lower end 46 of the beams 48, with one chain 72 lying along the interior side of the lower flange 66, as best shown in FIGS. 3 and 4. Four pairs of sprocket drive wheels 74 are supported on the trolley 50, two pairs at each end. On each side of the frame 62, the chain 72 is passed over the two sprocket drive wheels 74 in an S-shaped curve, as indicated by numeral 76 in FIG. 3. The sprocket drive wheels 74 thereby engage the frame 62 to the chain 72.

Each sprocket drive wheel 74 is independently driven by a hydraulic motor 78. The pressurized fluid for each motor 78 is supplied by a hydraulic power supply 80, which in turn is driven by an electric motor 82. To ensure that the left and right sides of the trolley 50 are driven at the same speed up or down the beams 48, a synchronization shaft 84 is connected between two opposing sprocket drive wheels 74 on the opposite sides of the frame 62. These two synchronized sprocket drive wheels cannot turn at different rates due to the synchronization shaft 84. Because all of the sprocket drive wheels on each side of the frame must turn at the same rate due to the synchronizing effect of the chain, the lateral synchronization of just one pair of sprocket drive wheels by the synchronization shaft 84 ensures that the trolley 50 must move along the beams uniformly.

The hoist 52 is mounted to the frame 62 of the trolley 50. The hoist 52 includes cables 86 that mount to a lifting frame 88, which in turn attaches to the top of the container 26 with hooks 90. To lift a container 26, the lifting frame 88 is attached to the container 26 and the hoist 52 is operated. A motor 92 causes the hooks 90 to retract when the container 26 is to be released.

The lifting frame 88 must be maintained level with the earth, regardless of how high the trolley moves up or down the beams 48. Otherwise, the produce can spill from the top of the open and unsealed containers 26. The lifting frame 88 is pivotably supported from the trolley frame 62 by a pivot rod 94 that extends transversely to the beams 48. The lifting frame 88 is pivoted about the pivot rod 94 by and maintained level with respect to the earth by the operation of a hydraulic levelling piston 94 attached between the trolley frame 62 and the lifting frame 88.

The four lifting cables 86 at the four corners of the lifting frame 88 are independently wound around two pairs of cable drums 98. The cables 86 pass over pairs of pulleys 100 attached to the top of the lifting frame 88, and to slack takeup pistons 102 on the underside of the trolley frame 50. A motor 104 drives each cable drum 98 to wind or unwind cable. When the lifting frame 88 is raised to its uppermost position tight against the underside of the trolley frame 62, any slack in one or more of the cables 86 is removed by operation of its slack takeup piston 102.

The gas within the enclosure is supplied by a gas flow system 120, illustrated in FIG. 9. In the preferred embodiment, the interior of the enclosure 22 is filled with a gas of composition 2 volume percent oxygen, 2 volume percent carbon dioxide, balance nitrogen. Because the environment is to be maintained to these values $+/-\frac{1}{2}$ percent for extended periods of time, a recirculating system is preferred. This system 120 continuously removes a flow of gas from the interior of the enclosure 22, purifies and adjusts it to the proper composition as required, and returns the gas to the interior of the enclosure 22.

A gas flow 122 to the system 120 is compressed by a compressor 124, and purified by passage through a centrifugal separator and coalescing filter 126. The gas then enters a semi-permeable membrane 128 formed of thousands of tiny hollow polymeric membranes. The various gaseous molecules diffuse through the membranes at differing rates, so that impurities can be tapped off and removed. Additional makeup gases can be added as required. The purified gas is returned to the interior of the enclosure 22, preferably through an outlet on or near the tower 44. The gas pressure of the purified gas returned to the enclosure 22 is preferably just slightly above atmospheric pressure, to aid in excluding the atmosphere from the interior of the enclosure 22. Gas flow systems of this type are known, and a satisfactory gas flow system 120 is available commercially from the Liquid Air Corporation, Walnut Creek, CA.

Containers enter the enclosure 22 through an entry port 130, and leave through an exit port 132. When a container 26 is moved into the enclosure 22 through the entry port 130 or removed through the exit port 132, care must be taken so that air does not enter the enclosure 22 to alter the composition of the gas. When a container 26 is introduced into the enclosure 22 through the entry port 130, care must also be taken so that the warm container and produce, which typically amounts to more than 25,000 pounds, does not unduly heat the interior of the enclosure 22.

In the preferred approach, the container 26 passes through an entry tunnel 134 prior to passing into the interior of the enclosure 22. The entry tunnel permits continuous movement of containers 26 into the enclosure 22, while removing air and cooling the containers 26 and produce. Alternatively, a system of air locks could be used, but such an approach would require large vacuum pumping capacity and would be much slower than the tunnel approach.

Figure 8:
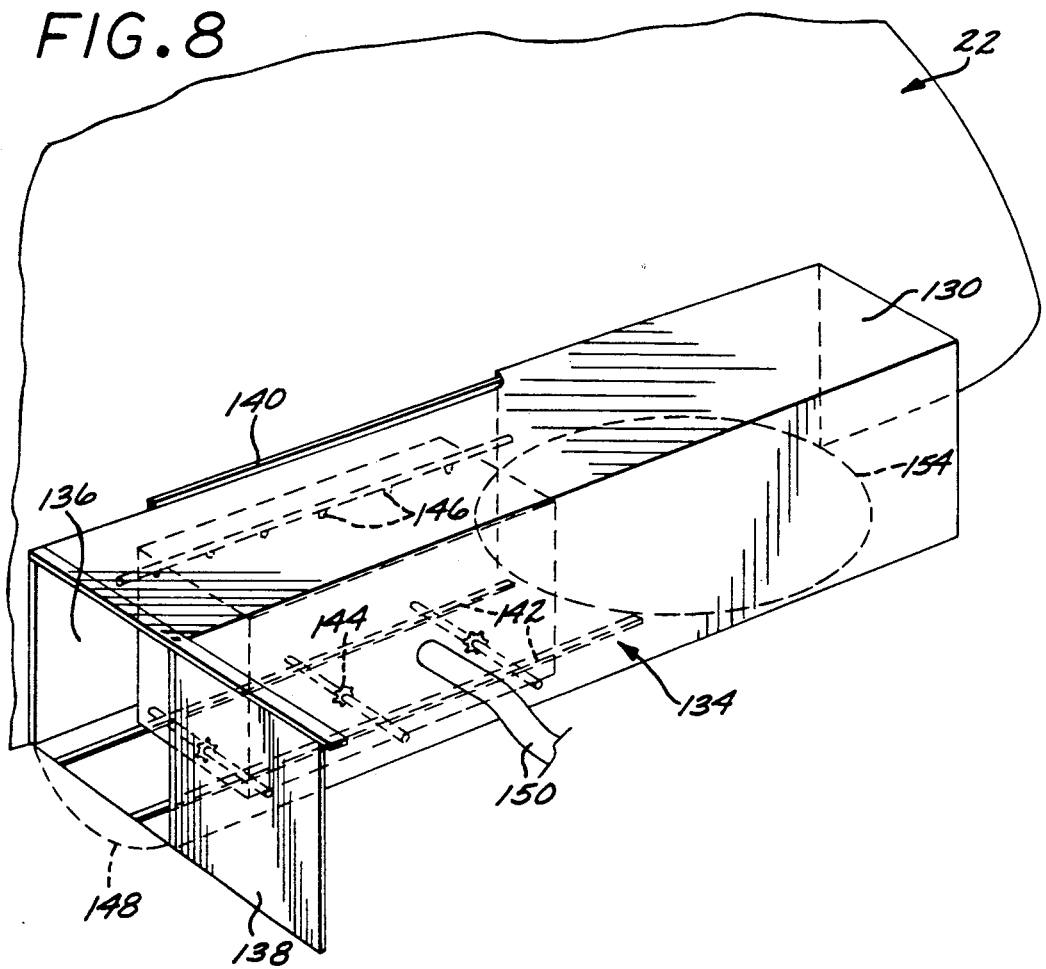
FIG. 8 is a perspective cutaway view of the entry tunnel to the storage facility.

The preferred construction of the entry tunnel 134 is illustrated in FIG. 8. The tunnel 134 extends from a tunnel entrance 136 to the entry port 130. It is formed of a conventional construction. There are sliding doors 138 and 140 that close the two ends of the tunnel 134 when it is not in use.

Within the tunnel 134 are two skids 142 upon which the containers 26 are supported and slide. The containers enter through the tunnel entrance 136 and move forward toward the entry port 130 under the urging of a cog drive 144 that engages the underside of the container 26. There are cog drives located periodically along the length of the tunnel 134, so that all of the containers 26 are moved forward at the same rate. The preferred tunnel 134 is long enough for about seven containers 26 to reside in the tunnel 134 at once, but in FIG. 8 the length of the tunnel has been shortened for illustrative purposes. The residence time of each container within the entry tunnel can be varied by changing the movement rate of the cog drive, but typically varies from about 7 to about 45 minutes.

The tunnel 134 acts as a hydrocooler in this preferred embodiment. A plurality of water spray nozzles 146 are set into the walls and ceiling of the tunnel 134. Cold water, at a temperature just above freezing, is sprayed onto the containers 26 and their contents as they move along the length of the tunnel 134. The water is caught in a sump 148 that runs the length of the tunnel 134, and is then recooled and recycled through the spray nozzles 146. The water rapidly cools the containers and produce, so that they are at about 34° F. when they pass through the entry port 130.

At least a portion of the gas flow 122 to the gas supply system 120 is preferably withdrawn through a gas line 150 that joins the tunnel 134 near the tunnel entrance 136. As the containers 26 are pushed into the tunnel entrance 136, a small amount of contaminating air enters the tunnel 134. The slight positive pressure within the interior of the enclosure 22 and the gas flow 122 out of the tunnel 134 through the gas line 150 establish a countercurrent flow of gas toward the tunnel entrance 136. The contaminating air is thus swept to the gas supply system 120 and removed before it can reach the interior of the dome.

The exit port 132 is similarly provided with an exit tunnel 152 of similar construction to the entry tunnel 134. A countercurrent gas flow system like that just described prevents the flow of air into the enclosure 22. However, the exit tunnel 152 has no hydrocooling system, as the cold fruit is simply moved outside of the enclosure 22 and permitted to warm naturally to ambient temperature. The exit tunnel 152 is therefore not as long as the entry tunnel.

Immediately adjacent the entry port 130 and the exit port 132, within the interior of the enclosure 22, are an entry turntable 154 and an exit turntable 156, respectively. The entry turntable 154 receives containers 26 from the skids 142 and reorients the containers 26 so that they can be grasped by the polar crane 40 after it has been moved to the proper location. Similarly, the exit turntable 156 receives containers 26 from the polar crane 40, and then reorients them so that they are in the proper orientation to be moved into the exit tunnel 152.

The interior of the enclosure 22 is maintained at reduced temperature by a heat exchanger 160 built into the tower 44. A cold fluid flows through the heat exchanger 160, and heat from the interior of the enclosure 22 is transferred into that fluid. The temperature of the interior of the enclosure is determined by balancing the temperature and rate of flow of the cold fluid through the heat exchanger 160 against the heat input into the enclosure through its walls.

Figure 6:
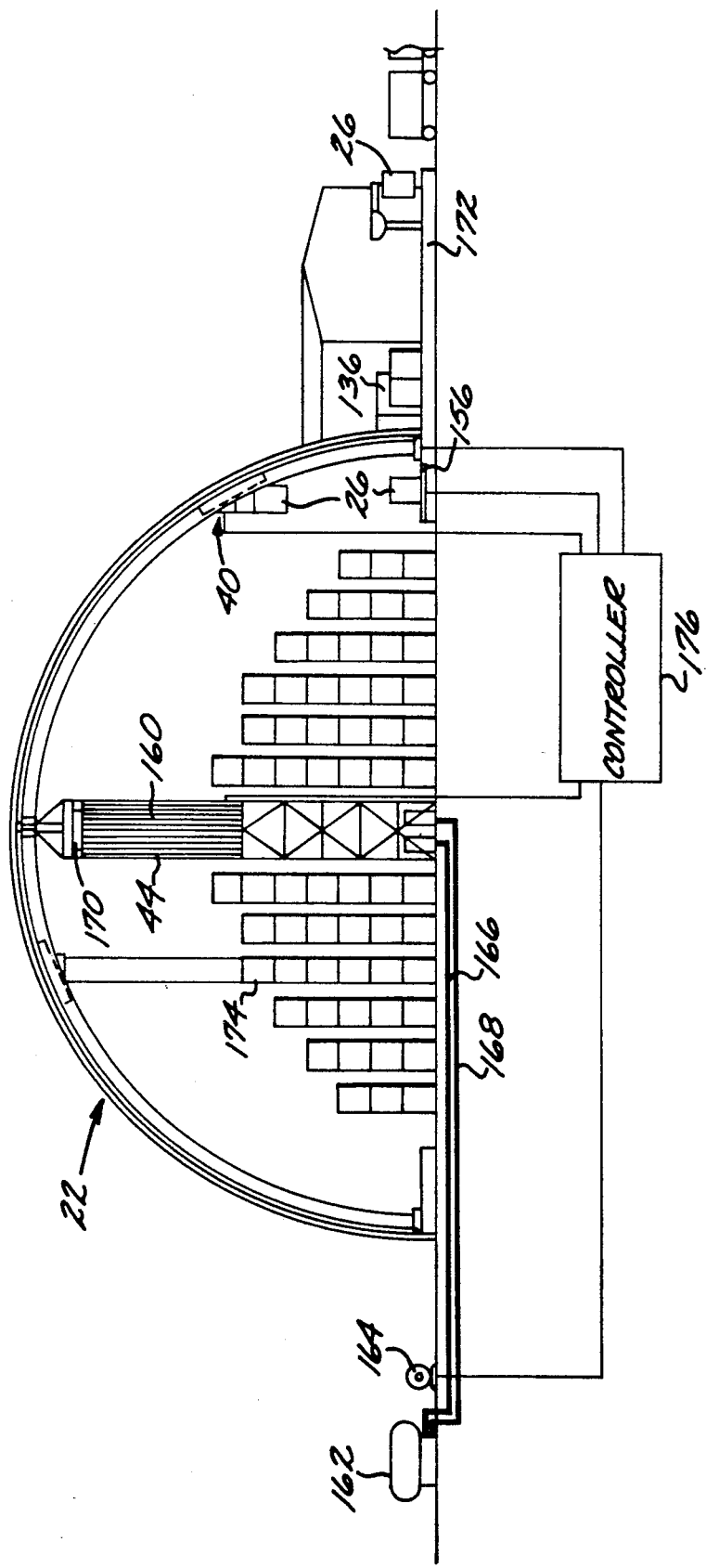
FIG. 6 is a side sectional view of the storage facility of FIG. 1, with portions of the system illustrated schematically and the control system of the storage facility indicated.

FIG. 6 illustrates the cooling system. In the preferred embodiment, liquid ammonia from an ammonia tank 162 is pumped by a compressor 164 through an underground pipe 166 to the base of the tower 44. The liquid ammonia flows upwardly into the heat exchanger 160, receives heat from the interior of the enclosure 22, and then exits through a pipe 168. A large fan 170 in the top of the tower 144 draws the gaseous environment of the interior of the enclosure 22 past the heat exchanger 160. The fan 170 is preferably powered by a hydraulic motor.

FIG. 6 also depicts the overall flow of produce in the storage facility 20. Already loaded containers 26 are delivered to a loading dock 172 of the facility 20 on flatbed trucks. There are typically two containers 26 per truck load. The containers 26 are transferred to the loading dock 172 by a jib crane. The containers 26 are pushed into the entry tunnel 134, and from that point the storage facility 20 handles the containers 26 in a fully automated manner.

Upon delivery of the cooled container 26 to the entry turntable 154, the polar crane 40 lifts the container 26 and moves it to a stack of containers 174. (There is only a single polar crane, but in FIG. 6 the single crane is shown in two positions for illustrative purposes.) When a container is to be removed, this process is repeated, except that the container is delivered to the exit turntable. Some unstacking and restacking may be required to remove the container. In normal commercial operations, customers are asked to make requests for removal of containers at least 24 hours in advance, so that unstacking and restacking operations, if necessary, may be performed at night or other slow times. The container to be removed can thereby be placed at the top of a stack so that it is easily reached the next day.

A controller 176, which is preferably a programmed microcomputer, controls the operation of the storage facility 20. The controller 176 receives sensor inputs, analyzes the inputs, and controls various environmental functions. The controller 176 also commands the operation of the container transfer apparatus. Finally, the controller keeps track of the location of each particular container, so that it can be recalled upon request.

The controller 176 receives several sensor inputs from a sensor package 178 located on the tower 44. These sensors include an coolant detector, coolant temperature sensor, coolant pressure sensor, atmosphere temperature sensor, gas velocity sensor, and atmosphere composition sensor. Additionally, there are lights and at least one television sensor located on the tower. The controller 176 receives a signal indicative of the circumferential position of the polar crane from a rotary position encoder 180 located on the pivot at the top of the tower 44. The 360 degrees about the tower are divided into increments, and the exact lateral position of the polar crane 40 is indicated by the measurement of the encoder 180.

The controller receives sensor inputs from sensors mounted on the trolley 50. These inputs include the temperature of the gas environment, an encoder 182 for the position of the trolley along the beams 48, encoders 184 that count rotations of the cable drums 98, a bar code reader that senses the identity of the container 26, a level indicator 186 that senses the tilt of the lifting frame 88, strain gauges on each cable, limit switches for the movement of the trolley and the hoist, and a hydraulic leak detector. There is also preferably at least one television camera and associated lighting on the trolley 50.

The controller 176 receives sensor inputs from the base 56 and traversing mechanism 54, including obstruction detectors 188 that prevent the base 56 from running into objects, a distance movement encoder, and a hydraulic leak detector.

The controller 176 provides control outputs to the polar crane, including motors 60, 78, 82, 92, and 104, to achieve precise movement and positioning of a container 26. The controller 176 controls the compressor 124 and the makeup gas input in the gas supply system 120. The controller controls the motors of the cog drive 144, and the turntables 152 and 154. Finally, the controller 176 controls the fan 170, the compressor 164, and valves that alter the flow path of the coolant to and from the heat exchanger 160.

A storage facility as described herein has been constructed and placed into operation to ascertain its operating parameters. The containers that hold the produce are about 8 feet high, 8 feet wide, and 17 feet long. Each container holds about 25,000 pounds of apples. The domed enclosure of the storage facility is 115 feet high and about 230 feet in diameter at the base. The temperature within the storage facility is controlled to $34° +/- \frac{1}{2}°$ F., and the gas composition is controlled to $+/-0.2$ percentage point variation in oxygen and carbon dioxide. The containers are routinely positioned with a tolerance of $+/-\frac{1}{4}$ inch, and have been stacked up to 10 high without mishap. Upon arrival, containers are cooled from the delivery temperature of 70°–90° F. to 34° F., and placed into the protective gas atmosphere, within about 10–45 minutes after arrival at the facility. (With prior closed controlled atmosphere facilities, cooldown typically requires up to 7 days.) The preferred coolant is liquid ammonia, but any suitable coolant may be used.

The live storage facility of the invention thus provides much greater flexibility in operation than available with prior sealed systems. Altough particular embodiments of the invention have been described in detail for purposes of illustration, various modifications may be made without departing from the spirit and scope of the invention. Accordingly, the invention is not to be limited except as by the appended claims.

What is claimed is:

1. A controlled atmosphere storage facility for storing a plurality of storage containers, comprising:
   a gas-tight enclosure for containing a plurality of storage containers;
   means for supplying a gas other than air into the enclosure;
   means for introducing storage containers into the enclosure without moving those storage containers already in the storage facility and without introducing contaminant gases into the storage facility;
   means for removing storage containers from the enclosure without moving other storage containers in the storage facility and without introducing contaminant gases into the enclosure;

means inside the enclosure for moving the containers within the enclosure;

a position sensor within the enclosure; and controller means for receiving an input from the sensor within the enclosure and for controlling the automatic operation of the means for introducing, the means for removing, and the means for moving.

2. The storage facility of claim 1, wherein the gas-tight enclosure includes a hemispherical dome set upon a foundation.

3. The storage facility of claim 2, wherein the construction of the wall of the dome includes a layer of a gas barrier, a layer of insulation, and a layer of concrete.

4. The storage facility of claim 1, wherein the means for supplying a gas other than air includes a closed cycle gas purification means for removing a flow of contaminated gas from the enclosure, purifying the flow of gas, and introducing the purified gas into the enclosure.

5. The storage facility of claim 1, wherein the means for supplying a gas other than air comprises means for supplying a mixture of about 2 percent by volume oxygen, about 2 percent by volume carbon dioxide, and the balance nitrogen.

6. The storage facility of claim 1, wherein the means for introducing includes a tunnel through a wall of the enclosure.

7. The storage facility of claim 1, further including means for cooling the containers within the enclosure.

8. The storage facility of claim 1, wherein the means for moving includes a crane.

9. The storage facility of claim 1, further including means for cooling the containers within the means for introducing.

10. A controlled atmosphere storage facility for storing a plurality of storage containers, comprising:

a gas-tight enclosure for containing a plurality of unsealed storage containers;

an entry tunnel connected to the enclosure and having means through which storage containers are moved into the enclosure without moving those storage containers already in the enclosure and without introducing contaminant gases into the enclosure;

an exit tunnel connected to the enclosure and having means through which storage containers are moved out of the enclosure without moving other storage containers in the enclosure and without introducing contaminant gases into the enclosure;

a crane within the enclosure, the crane being capable of moving the storage containers;

a remote control means for controlling the movement of the crane from outside the enclosure;

a gas supply means for introducing a flow of decontaminated gas into the enclosure, and for withdrawing contaminated gas through the entry and exit tunnels; and a cooling means for cooling the storage containers as they are moved through the entry tunnel and while they are within the storage facility.

11. The storage facility of claim 10, wherein the gas-tight enclosure includes a hemispherical dome set upon a foundation.

12. The storage facility of claim 11, wherein the construction of the wall of the dome includes a layer of a gas barrier, a layer of insulation, and a layer of concrete.

13. The storage facility of claim 10, wherein the means for introducing gas includes closed cycle gas purification means for removing contaminated gas from the enclosure, for purifying the contaminated gas, and for introducing the purified gas into the enclosure.

14. The storage facility of claim 10, wherein the means for introducing a decontaminated gas comprises means for supplying a mixture of about 2 percent by volume oxygen, about 2 percent by volume carbon dioxide, and the balance nitrogen.

15. A controlled atmosphere produce storage facility for storing a plurality of storage containers, comprising:

a plurality of unsealed storage containers that contain produce;

a hemispherical gas-tight enclosure resting upon a foundation, for containing the storage containers;

an entry tunnel connected to the enclosure and having means through which storage containers are moved into the enclosure without moving those storage containers already in the enclosure and without introducing contaminant gases into the enclosure, the entry tunnel having a water spray means for spraying cool water over the storage containers as they move through the entry tunnel;

an exit tunnel connected to the enclosure and having means through which storage containers are moved out of the enclosure without moving other storage containers in the enclosure and without introducing contaminant gases into the enclosure;

a recirculating gas supply means for introducing a flow of a gas mixture of about 2 percent oxygen, 2 percent carbon dioxide, and balance nitrogen into the enclosure, for withdrawing a flow of the gas mixture from the enclosure through the entry and exit tunnels, and for conditioning the flow of the gas mixture before reintroducing it into the enclosure;

a cooling tower in the center of the hemispherical enclosure through which a coolant is circulated; and a polar crane within the enclosure for moving containers within the interior of the enclosure, the crane being pivotably supported upon the upper end of the cooling tower and upon the foundation.

16. The storage facility of claim 10, wherein the construction of the wall of the enclosure includes a layer of a gas barrier, a layer of insulation, and a layer of concrete.

17. The storage facility of claim 15, wherein each container has dimensions of about 8 feet high, 8 feet wide, and 17 feet long.

18. The storage facility of claim 15, further including means for supplying a coolant that is circulated through the cooling tower, and wherein the coolant is liquid ammonia.

19. The storage facility of claim 15, further including a remote control system that controls the operation of the crane from a location outside the enclosure.

20. The storage facility of claim 15, wherein the produce is apples.

21. The storage facility of claim 15, further including a fan mounted upon the cooling tower to force a recirculating movement of the gas within the enclosure.

* * * * *